Patented Oct. 23, 1928.

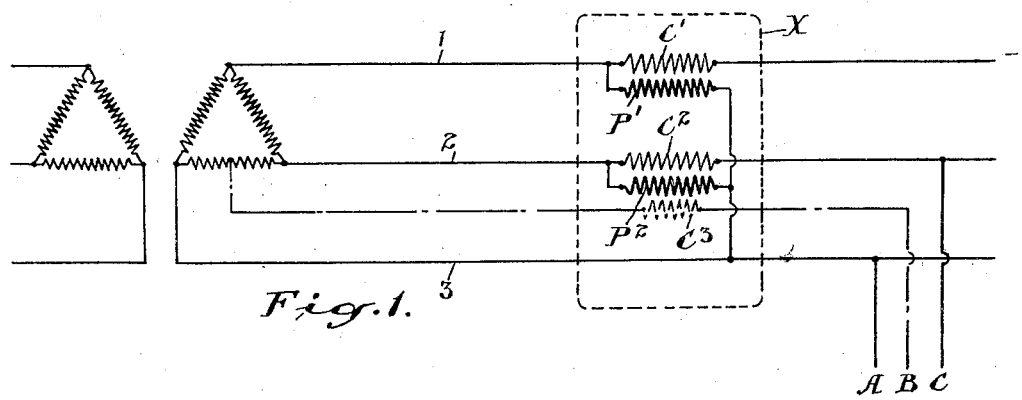
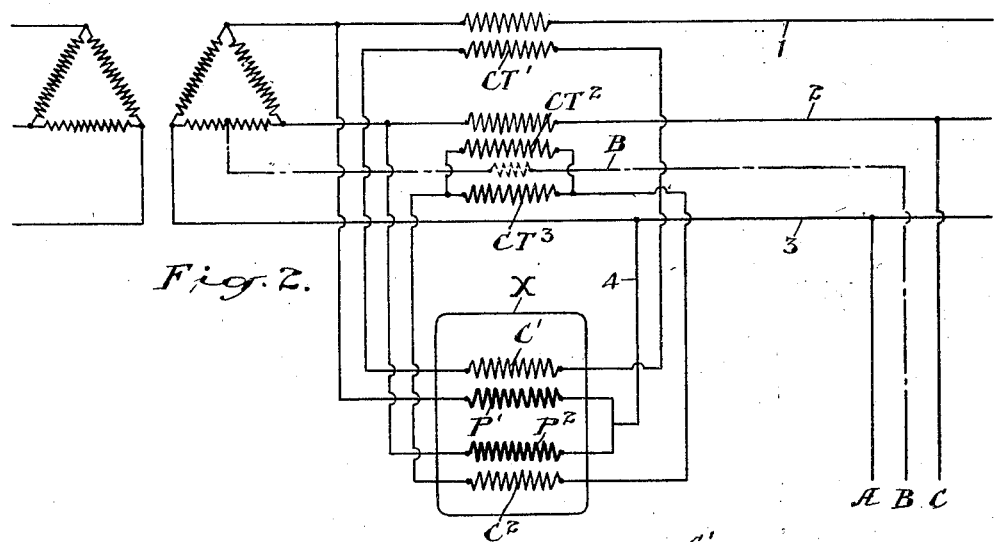
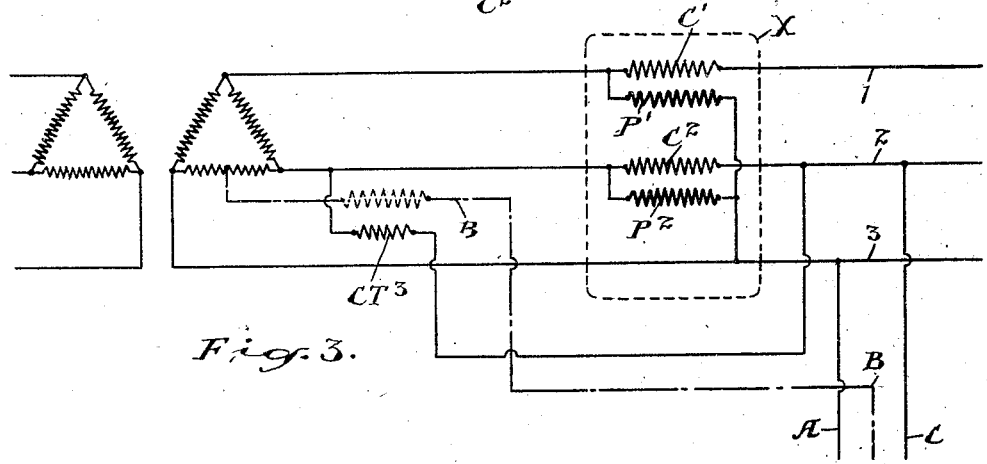

1,688,858

UNITED STATES PATENT OFFICE.

GEORGE F. DREWRY, OF TORONTO, ONTARIO, CANADA, ASSIGNOR TO THE LINCOLN METER COMPANY, LIMITED, OF TORONTO, CANADA.

METER FOR MEASURING COMBINED POLYPHASE AND SINGLE-PHASE ELECTRICAL ENERGY.

Application filed February 20, 1922. Serial No. 537,879.

The principal objects of the invention are to economize in the installation of power measuring instruments for measuring the power in a polyphase source of electrical supply, enabling the measurement of power from the polyphase supply and from a 3 wire system in a single phase of the supply in the same instrument, thus effecting economy in the general administration of the supply in addition to the initial installation cost.

The principal feature of the invention consists in introducing into a polyphase watt meter a current coil connected with the neutral wire of a 3 wire single phase circuit of the polyphase system and arranging such current coil in relation to the potential and current coil of the single phase from which the 3 wire lower voltage system is derived so that any current used in either portion of the divided single phase will be recorded accurately.

In the drawings, Figure 1 is a diagram illustrating the simplest application of the invention by the arrangement of a current coil, connected with the neutral wire introduced into one of the phases of a polyphase system.

Figure 2 is a diagram illustrating the arrangement of a current transformer in the neutral of the single phase service arranged in one of the phases of a polyphase system and, operating in parallel with the current transformer in one of the phase wires of the same phase.

Figure 3 is a diagram illustrating the arrangement of a current transformer, arranged in parallel with the current coil of the meter in one of the phase wires of the same phase of one of the phases of a polyphase system.

In the application of the invention as illustrated in Figure 1, a 3-phase 3 wire system is illustrated with the wires 1, 2 and 3, and a single phase supply is illustrated with the wires A, B and C, the wire B forming the neutral in the division of the voltage across 2—3. The meter represented by the dotted line X, is provided with current coils $C^1$ and $C^2$ in the 3 phase wires 1 and 2. The potential coils $P^1$ and $P^2$ are connected to the wires 1 and 2 and to each other and to the wire 3.

Assume that a single phase 3-wire 220/110 volt lighting circuit, as represented by the wires A, B and C, is connected in the phase between the wires 2 and 3, the neutral being B, and that in this wire is introduced a current coil $C^3$. This coil is arranged to operate with potential coil $P^2$, so as to produce torque, in a similar manner to the current coil $C^2$. When current is being used and the single phase 3-wire load is unbalanced, the torque of the coil $C^3$ adds to or subtracts from the torque of the coil $C^2$, depending on which side of the 3-wire circuit the greater load exists, that is to say, when the load on the circuit AB is greater than that on BC, the torque of the coil $C^3$ will add to the torque of the coil $C^2$ and increase the meter registration, but if the greater load is on BC, the torque of the coil $C^3$ will subtract from the torque of the coil $C^2$ and decrease the meter registration. The result will give an accurate measurement. It is of course necessary that the current coil $C^3$ and the current coil $C^2$ be connected to operate with the same potential coil $P^2$ or with separate potential coils of the same strength and same phase relation as the coil $P^2$, such coil $C^3$ having one-half the turns of the coil $C^2$.

It will be readily seen from this description that electrical energy may be derived separately from either the polyphase or single phase circuits, or jointly from both, and the meter will record accurately under each of these circumstances.

In the diagrammatic illustration in Figure 2 a different arrangement of special current transformer is shown. The potential coils $P^1$ and $P^2$ are connected by a common conductor 4 to the main phase wire 3, and the coil $P^1$ has its opposite end connected to the phase wire 1, while the coil $P^2$ is connected at its opposite end with the phase wire 2. The current transformer coil $CT^1$ operating in the phase wire 1, is connected with the current coil $C^1$ in the meter X, which operates in conjunction with the potential coil $P^1$, to produce torque, and the current transformer $CT^2$ operating in the phase wire 2 is connected with the current coil $C^2$ arranged to operate in conjunction with potential coil $P^2$ to produce torque.

A current transformer $CT^3$ is arranged to operate in parallel with the current transformer $CT^2$, and this transformer is connected and operates in the neutral wire B of the 3-wire single phase circuit, and its action is precisely similar to that of coil $C^3$ illustrated in the diagram in Figure 1.

A further modification in the arrangement of a special current transformer is illustrated in diagram in Figure 3 where this transformer $CT^3$, connected and operating in the neutral wire B is arranged in parallel with the current coil $C^2$ in phase wire 2. A system of balancing the effect of the current coils as described is extremely simple but is effective in accomplishing accurate measurement, and its introduction into meters of various types is a simple matter.

What I claim as my invention is:

1. In a meter, the combination with a three-phase source of electrical supply, one phase of which is divided into a single phase three wire system by a neutral central wire, of potential and current meter coils connected with the three-phase source, and a current coil arranged in said neutral wire of the single phase three wire system adapted to influence the total flux of the aforesaid meter coils.

2. In a meter, the combination with a three phase source of electrical supply, one phase of which is divided into a single phase three wire system by a neutral central wire, of potential and current meter coils connected with the three phase source, and a current coil arranged in said neutral wire and having a number of turns proportional to the turns in the adjacently arranged current coil of one of the wires of the three phase source, said proportion being in the ratio of the tap voltages of the sub-divided phase of the three phase source to the phase voltage, said neutral wire current coil co-operating with the afore-mentioned current coil in controlling the torque produced by the potential and current coils in the three phase source.

3. In a meter, the combination with a three phase electric source, one phase of which is divided into a single phase three wire system by a neutral central wire, of current coils arranged in two of the mains of the three phase source, potential coils connected with the mains containing the said current coils, both being connected together and to the remaining lead of the three phase source, and a current coil arranged in the neutral wire of the three wire single phase system arranged adjacent to the potential coil of the single phase from which the three wire single phase system is derived, as and for the purpose described.

4. The combination with a three-phase circuit and a transformer comprising primary and secondary circuit windings, of a three-conductor single-phase circuit comprising two conductors of the three-phase secondary circuit and an auxiliary conductor connected to the secondary circuit, and a meter comprising coils for connection to the three-phase secondary circuit and an auxiliary coil connected to said auxiliary conductor for co-operation with certain of said first meter coils.

5. The combination with a three-phase circuit and a transformer comprising primary and secondary-circuit windings, of a three-conductor single-phase circuit comprising two conductors of the three-phase secondary circuit and an auxiliary conductor connected to an intermediate point of one leg of said secondary winding, and a watt-hour meter comprising two groups of current and voltage coils for connection to the three-phase secondary circuit and an auxiliary current coil connected to said auxiliary conductor for co-operation with a voltage coil of one of said groups.

GEORGE F. DREWRY.